United States Patent [19]

Nakao et al.

[11] 4,119,435

[45] Oct. 10, 1978

[54] PROCESS OF PREPARING SOYBEAN POLYSACCHARIDES

[75] Inventors: Yukihiro Nakao, Tondabayashi; Kasumi Miyashita, Kobe; Jun Toda, Osaka, all of Japan

[73] Assignee: Takeda Chemical Industries, Ltd., Osaka, Japan

[21] Appl. No.: 803,304

[22] Filed: Jun. 3, 1977

[30] Foreign Application Priority Data

Jul. 30, 1976 [JP] Japan .................................. 51-91957
Aug. 30, 1976 [JP] Japan ................................ 51-103974

[51] Int. Cl.$^2$ ............................................. C13L 3/00
[52] U.S. Cl. ......................................... 127/34; 127/43; 260/123.5; 426/430; 426/431; 426/481; 426/489; 536/1
[58] Field of Search .................... 127/34, 43; 426/430, 426/431, 481, 489; 260/123.5

[56]  References Cited

U.S. PATENT DOCUMENTS

| 2,785,155 | 3/1957 | Anson | 426/431 X |
| 2,881,159 | 4/1959 | Circle | 426/431 X |
| 3,365,440 | 1/1968 | Circle | 426/430 X |
| 3,454,404 | 7/1969 | Watanabe | 426/481 X |
| 3,607,860 | 9/1971 | Yamato | 260/123.5 |
| 3,649,293 | 3/1972 | Hoer | 426/431 |
| 3,714,210 | 1/1973 | Schweiger | 260/123.5 UX |
| 3,926,940 | 12/1975 | Circle | 260/123.5 |
| 3,966,982 | 6/1976 | Becker | 426/430 |

FOREIGN PATENT DOCUMENTS 868,848  4/1971  Canada.

OTHER PUBLICATIONS

J. W. Finley, Jour. of Food Sci., 41, 882–885 (1976).

*Primary Examiner*—Sidney Marantz
*Attorney, Agent, or Firm*—Wenderoth, Lind & Ponack

[57]  ABSTRACT

Soybean polysaccharides are produced by extracting a residue which is obtained after the separation of soy proteins from soybean, with an aqueous alkaline solution and recovering the resultant solid fraction.

22 Claims, No Drawings

PROCESS OF PREPARING SOYBEAN POLYSACCHARIDES

This invention relates to a process of preparing soybean polysaccharides.

In recent year, industries using soybeans as starting materials have been in focus, with much research being done by both the professional and, industrial workers. The central theme of such research is proteins. However, soybeans and defatted soybeans contain not only proteins but also non-protein portions in almost comparable amounts. The research so far done has been directed to proteins, with the non-protein portion being thought of as residues, so that only a paucity of data has been available as to the effective utilization of the soybean non-protein portion.

The same holds true of the production of soybean curd, which is a traditional soybean industry. Particularly, the residue which is the byproduct of soybean-extracted proteins and soybean-isolated proteins, as well as the curd residue which is the product of curd production, has thus far effectively been utilized only with animal rations because of its 'brown' color and characteristically uncomfortable 'soy-odor'.

To achieve an effective utilization of such a residue, we have studied the feasibility of isolating polysaccharides from the residue.

The relevant problem concerns how to remove any remaining proteins and fats from such a residue material and recover polysaccharides in high purity. It has been found that the proteins remaining in the residue are difficult to manage because they cannot be extracted by mere aqueous extraction. As a means for removing those residual proteins there may be mentioned the process which comprises degrading the proteins with a proteolytic enzyme and washing the resultant low-molecular proteins with water to remove them.

This known method is not a commercially convenient method, since the proteolytic enzyme as such is expensive and the degradation process takes a prolonged period of time.

The research undertaken by the present inventors under the circumstances had led to a discovery of an inexpensive and commercially more convenient method.

The present invention relates to a production of polysaccharides from soybeans, characterized in that a residue, which is obtained after the separation of a liquid proteinous fraction from soybeans, is extracted with an aqueous alkaline solution and the solid matter is then recovered.

In accordance with this invention, the residue obtainable after the separation of a soy milk for separating proteins, fats, etc. from soybeans, said residue being commonly known as bean-curd residue, is employed as the starting material. Separation of this residue as such is known.

That is to say, the residue is obtainable by subjecting the soybean or defatted soybean to extraction with water, a dilute aqueous solution of a salt, the examples of such salts being NaCl or KCl, or an aqueous dilute alkaline solution, the examples of the alkali being NaOH, KOH, Ca(OH)$_2$, NH$_4$OH, and recovering the resultant residue. For example, there may be mentioned the residue obtainable after the extractive separation of proteins, soy milk, etc. by the process described in "Daizu Shokuhin"(Soybean Food)[Watanabe et al., published by Korin Shoin (1971), pages 76 to 87 and 229 to 256] or by the method described in "Soybeans: Chemistry and Technology", Vol. 1 (ed. A. K. Smith and S. J. Circle) Avi Publishing Co., 1972 p.321 to p.324. The above residue contains at least 80 (weight) percent of water and, on a dry basis, about 20 to 50 (weight) percent of proteins. Since the presence of large amounts of hulls is objectionable, it is preferable to employ a material which has been previously dehulled in one manner or another as the starting material. The residue material may be dried before use.

In the present method, the residue material may be employed after the proteins therein have been degraded to lower molecules using a proteolytic enzyme. As such an enzyme, there may be mentioned a proteolytic enzyme of the vegetable, animal or microbial origin, with papain, pepsin and Pronase [manufactured by Kaken Kagaku Co., Japan].

The aqueous alkaline solution in this invention is one showing a pH value of not less than 11, preferably pH 12 to 13.

Upon the extraction with the aqueous alkaline solution, the larger amount of proteins comes into the extract as the extraction temperature is increased but, in view of the hydrolysis of polysaccharides, the extraction is suitably carried out at temperatures in the range of about 40° to 60° C. The extraction time may generally be somewhere between about 15 minutes and about 2 hours, although it depends upon the extraction temperature, alkali concentration and the type of residue material.

As examples of said alkali may be mentioned alkali metal hydroxides such as sodium hydroxide, potassium hydroxide, etc. and ammonium hydroxide.

In carrying out the extraction with the aqueous alkaline solution, which is mentioned above, it is rather difficult to prevent completely the resultant polysaccharides from swelling because of their high water-holding capacity and the large amount of water to be used. The swelling is not advantageous in view of the efficiency of the subsequent neutralization, separation and drying processes.

It has further been found that employing an aqueous alkaline solution concomitant with a water-miscible organic solvent as the extracting solution can almost completely prevent the polysaccharides from swelling with water. This represents another aspect of the present invention.

As examples of the water-miscible organic solvent employed, there may be mentioned lower alcohol having 1 to 3 carbon atoms (e.g. ethanol, methanol, normal-propanol, iso-propanol), tertiary-butanol and their mixtures and acetone, with ethanol being the most suitable solvent in consideration of the contemplated use of the product as a food material. The organic solvent may contain water and/or any other solvents. The concentration of the water-miscible organic solvent for the extraction of the solution employed is desirably within the range of 30 to 70 (weight) precent. As will be seen from Experiment 1 which appears hereinafter, no appreciable reduction in liquid-holding capacity and, hence, no effects may be obtained if the proportion of the organic solvent is less than 30 (weight) percent. Moreover, as Experiment 2 shows, the extractive removal of proteins will be difficult if the proportion of the organic solvent exceeds 70 (weight) percent. The proportion of the solution employed, inclusive of that of the liquid contained in the residue, is 10 to 40 times, preferably 20 to 30 times the weight of solid matter.

To render the extracting solvent alkaline, use may be made, for instance, of an alkali metal hydroxide (e.g. sodium hydroxide, potassium hydroxide, etc.) or ammonium hydroxide, and sodium hydroxide is the most desirable. The extraction pH is not less than 11, preferably within the range of pH 12 to pH 13. While the extraction time and temperature varies with the concentration of alkali and the type of the residue, the extraction is carried out at a temperature of 20° C. or higher for 10 minutes to 5 hours and, preferably, at 40° to 60° C. for 0.5 to 2 hours.

The thus obtained extracting medium is then removed, for example by centrifugation, pressing, etc. and the solid fraction is recovered.

The above extraction procedure may be repeated a few times. While the pH of the second and subsequent extraction systems is not critical, it is preferably alkaline. When a water-miscible organic solvent is concomitant, there is no criticality as to the concentration of the organic solvent employed for the second and subsequent extraction-aqueous washing cycles, solutions containing over 70 (weight) percent of the organic solvent being permissible. The water-miscible organic solvent may be recovered from the soluble fraction.

In the described manner the protein content (on a dry basis) of the solid fraction can be reduced to no more than about 13%, preferably about 10%.

The solid fraction obtained in the above manner may, if necessary, be washed with water to get rid of the alkali or be suspended and neutralized with acid. In view of its intended use as a food material, the pH of the product is preferably adjusted to near neutrality for example pH 5 to 7. As examples of said acid there may be mentioned hydrochloric acid, sulfuric acid, phosphoric acid and acetic acid.

The above solid fraction is then filtered, centrifuged, pressed or otherwise processed to recover the water-insoluble polysaccharides as a solid residue.

The thus obtained solid residue is composed mainly of carbohydrate components (e.g. nitrogen-free extract, crude fibers), as well as a small amount of crude proteins (not higher than about 13 weight % on a dry basis, preferably not higher than about 10 weight % on a dry basis), crude fats (about less than 6 weight % on a dry basis) and crude ashes (about less than 8 weight % on a dry basis).

The carbohydrates comprise mainly polysaccharide compounds. In the present invention, the above solid residue itself is referred to as "polysaccharides".

The wet polysaccharides may be used as a food ingredient or, if necessary, dried, sieved and milled. The drying operation may be performed by any suitable known methods. These include the method of drying the solid product as it is by means of a hot air current or by vacuum-drying, forced air drying and the method which comprises preparing a slurry with a solid concentration of about 3 percent and spray-drying the same. Washing the solid product with an alcohol or the like prior to drying is also effective in achieving an improved drying efficiency. The milling operation may be carried out by means of an appropriate milling machine. For example, Fitz mill, pulverizer, atomizer, micron mill, jet mill or other equipment may be employed. Classification or sorting may be performed after drying and milling according to the intended application. Particularly where the starting material was a bean curd residue, the classification procedure gets rid of hulls, thus ensuring production of quality water-insoluble polysaccharides. Also, where the extraction residue of defatted soybean is employed as the starting material, the classification procedure suited for the intended use enables us to obtain water-insoluble polysaccharides appropriate for the intended use as a food component. The classification procedure is desirably a conventional dry-sorting method, such as air classification or sieve-screening.

While the critical size depends upon the intended application, powders passing a 100-mesh screen (JIS standard) or finer are desirable for ordinary food material, while 200-mesh or finer powders are preferred for foods of which a white appearance is important.

The hulls of soybean may be removed in any stage of production but are preferably removed during the preparation of said starting residue or after said neutralization. To remove the hulls, there may be employed such processes as crushing and sieving.

The present method is an inexpensive and commercially convenient method for the production of polysaccharides from soybean. The polysaccharides have a high water-holding capacity and are applicable to a food material.

And the present method gives polysaccharides from soybean in a high purity, with a less amount of solvent being required relative to that of conventional methods.

The present product polysaccharides are white, tasteless and odorless, and may be utilized as a waterholding, shape-retaining or/and dispersing agent, among other applications, in fish paste products, animal meat products, powdery food, rice cakes, confections, bean jam, noodles and other flour products, bread, cooked foods such as hamburger, gyoza, shumai (Chinese dishes) and so on. The addition of this product results in improved processability and reduced cooking loss in the case of cooked food, increased firmness and reduced pressure-releases of fluids in the case of fish paste products, and suppressed water evaporation and, hence, sustained softness in the case of cakes and confections. Depending upon the type of food and the objective of addition, the present polysaccharides are normally incorporated into food to give a concentration of 0.5 to 10 (weight) percent.

Hereinbelow are experiment examples, reference examples, working examples and application examples. In the present invention, all percents (%) means weight percents (w/w) unless otherwise indicated. And in the following examples "part(s)" is based on weight unless otherwise noted and the relationship between "part(s)" and "part(s) by volume" corresponds to that between "gram(s)" and "milliliter(s)".

EXAMPLE 1

To defatted soybean flours with high nitrogen solubility index (NSI) 50-mesh and finer (commercial product) was added 10 times their weight of water and the mixture was stirred at 90° C. for 30 minutes. The extract was centrifuged and the resultant solid fraction was washed with 4 times its weight of water and centrifuged. The solid extraction residue was recovered.

To the residue was added a sufficient amount of water to make a slurry with a solid content of 2% and a sodium hydroxide concentration of 0.4% (pH about 13) and the mixture was stirred at 60° C. for 1 hour. Following this extraction phase, the mixture was centrifuged and the supernatant is discarded to recover the solid residue. This solid residue was diluted again with water to prepare a slurry with a solid concentration of 3%, which was stirred, washed with water and centrifuged. The solid fraction was further diluted with water to make a 5% slurry which was adjusted to pH 6.5 with hydrochloric acid and centrifuged to recover a solid which is water-insoluble polysaccharides. This product was dried in a box air dryer at 80° C. for 2.5 hours. It was then atomized and sieved on a 100-mesh screen to obtain a powdery water-insoluble polysaccharides (finer than 100 mesh). This water-insoluble polysaccharides was composed of:

| Moisture | | 4.1 (%) |
|---|---|---|
| Crude proteins | | 5.6 |
| Crude fats | | 0 |
| Crude ashes | | 5.3 |
| Carbohydrates | Crude fibers | 7.5 |
| | Nitrogen-free extracts | 77.5 |
| The water-holding capacity of this polysaccharide is as follows. | | 15.2 g/g |

The amount (g) of water contained per gram of the solid fraction was taken as "water-holding capacity".

EXAMPLE 2

A bean curd residue (commercial product) was dispersed in water to prepare a slurry with a solid content of 2.5% and a sodium hydroxide concentration of 0.4% (pH about 13). The extraction was carried out at 60° C. for 2 hours, after which the system was centrifuged, the supernatant being discarded. The residual solids were diluted with water to prepare a slurry with a solid content of 5%, followed by stirring and washing with water. Following the stirring and washing operation, the slurry was centrifuged to remove the liquid fraction. The solid residue was diluted with water to make a slurry with a solid content of 3% and adjusted to pH 6.5 with hydrochloric acid. After centrifuging, the residual water-insoluble polysaccharide cake was dried in a box-type air dryer at 90° C. for 2 hours. The dried product was crushed in an atomizer and sieved on an 80-mesh screen to obtain a water-insoluble polysaccharide.

The water-insoluble polysaccharide thus obtained was found to have the following analysis and water-holding capacity.

| Moisture | | 4.6 (%) |
|---|---|---|
| Crude proteins | | 10.0 |
| Crude fats | | 4.9 |
| Crude ashes | | 5.8 |
| Carbohydrates | Crude fibers | 9.6 |
| | Nitrogen-free extracts | 65.1 |
| Water-holding capacity | | 12.4 g/g |

EXAMPLE 3

The extraction residue obtained by a procedure similar to that described in Example 1 was diluted with water to prepare a slurry with a solid content of 2.5% and a sodium hydroxide concentration of 0.2% (pH about 12.5). The slurry was stirred at 60° C. for 30 minutes, after which it was pressed to remove the water, leaving a solid fraction. To the solid fraction was added a sufficient amount of water to prepare a slurry with a solid content of 4% and adjusted to pH 6.7 with hydrochloric acid. The slurry was pressed to remove the neutral liquid fraction, whereby a water-insoluble polysaccharide was obtained as a solid fraction. This fraction was diluted with water to prepare a slurry with a solid content of 3% which was then spray-dried. Following the drying procedure, the product was sieved on a 100-mesh screen to obtain a powdered water-insoluble polysaccharide passing the screen.

The resultant polysaccharide was found to have the following analysis and water-holding capacity.

| Moisture | | 4.0 (%) |
|---|---|---|
| Crude proteins | | 9.8 |
| Crude fats | | 0 |
| Crude ashes | | 7.5 |
| Carbohydrates | Crude fibers | 8.3 |
| | Nitrogen-free extracts | 70.4 |
| Water-holding capacity | | 13.5 g/g |

REFERENCE EXAMPLE 1

(Method of producing an extraction residue from defatted soybean)

To dehulled and defatted soybean flour of high NSI, JIS 50 mesh or finer (commercial product), is added 10 times its weight of water and the mixture was stirred at 60° C. for 30 minutes to extract out the proteins, followed by centrifugation. To the residue was added 4 times its weight of water and, after washing, the mixture was centrifuged to separate the desired residue.

EXAMPLE 4

To 1000 parts of a defatted soybean residue with a solid content of 12% (protein content 24% on a dry basis) was added 560 parts of water together with 960 parts of ethanol and 9.6 parts of sodium hydroxide (the ultimate concentration of ethanol: 40%). The extraction was carried out under stirring at 60° C. for 30 minutes (pH about 13).

Then, the mixture was pressed to recover 258 parts of residue (solid content 92.6 parts). This residue was dispersed by the addition of 500 parts of ethanol and adjusted to pH 6.5 with 10% hydrochloric acid. It was then pressed to collect the residue. By the above procedure was obtained 260 parts (33% solid) of white water-insoluble soybean polysaccharide. This product was dispersed in water and spray-dried to obtain 81 parts of white powders. Analysis of the powders is as follows.

| Analysis | |
|---|---|
| Moisture | 5.7 % |
| Crude proteins | 3.8 |
| Ashes | 6.3 |
| Carbohydrates (Crude fibers, nitrogen-free extracts) | 84.2 |

The above product absorbs about 15 parts water per part (as determined by a procedure similar to that described in Experiment Example 1). This water-holding capacity is constant between pH 3 and pH 8 and does not change with temperature.

Thus, the product has a stable water-holding capacity.

EXAMPLE 5

One thousand parts of a residue from the production of soybean curd (which residue contained 82.3% water, 5.2% proteins, 1.4% fats, 0.6% ash and 7.3% carbohydrates) was dispersed in a mixture of 1200 parts of water containing 16 parts of sodium hydroxide and 2000 parts of ethanol (concentration of ethanol 50%; pH about 13). The extraction was carried out at 70° C. for 30 minutes, with constant stirring. The extract was centrifuged to recover an insoluble fraction, to which 4 times its weight of a 50% (W/W) aqueous solution of ethanol was added. The mixture was neutralized to pH 6.5 with 10% hydrochloric acid and pressed to remove the solvent. The insolubles were collected, dried, milled, and sieved. The powders passing through a 100-mesh sieve were recovered. By the above procedure was obtained 100 parts of white powders.

| Analysis | |
|---|---|
| Moisture | 4.6 % |
| Crude proteins | 9.6 |
| Ashes | 5.8 |
| Carbohydrates | 80.0 |
| (Crude fibers, Nitrogen-free extracts) | |

EXPERIMENT EXAMPLE 1

To the defatted soybean residue corresponding to 0.5 gram of solids was added 40 times its weight of an aqueous solution containing a water-miscible organic solvent and, after thorough stirring, the mixture was centrifuged at 3000 r.p.m. for 10 minutes. The supernatant fluid was discarded and the solid content of the sediment or cake was determined. The amount (g) of fluid contained per gram of the solid fraction was taken as "liquid-holding capacity".

| Liquid-holding capacity (g/g) | |
|---|---|
| Concentration of ethanol (W/W%) pH 13 | |
| 0 | 10.2 |
| 8 | 10.1 |
| 16 | 10.1 |
| 25 | 9.8 |
| 30 | 8.9 |
| 35 | 7.6 |
| 40 | 5.8 |
| 44 | 4.2 |
| Concentration of acetone (W/W %) pH 13 | |
| 8 | 10.3 |
| 16 | 9.2 |
| 25 | 7.3 |
| 30 | 5.3 |
| 35 | 3.5 |
| 40 | 3.0 |
| 44 | 2.7 |

Thus, the liquid-holding capacity are reduced to less than about a half (½) at about 40% or higher concentration in the case of ethanol and at about 30% or high concentration in the case of acetone.

EXPERIMENT EXAMPLE 2

To a defatted soybean residue with a protein content (on a dry basis) of 24% was added 40 times the weight of solid matter of a 1/10 N- solution (pH 13) of sodium hydroxide in aqueous ethanol. The mixture was shaken to extract the proteins at 60° C. for 30 minutes, after which it was filtered. The nitrogen content of the filtrate was determined and the percent extraction of proteins from the residue was calculated.

The following table gives data in terms of the total nitrogen content of the extract against the total nitrogen content of the residue.

| Concentration of ethanol (% W/W) | % Extraction of proteins (%) | Concentration of acetone (% W/W) | % Extraction of proteins (%) |
|---|---|---|---|
| 0 | 64 | 0 | 64 |
| 10 | 67 | 10 | 71 |
| 20 | 65 | 20 | 70 |
| 30 | 74 | 30 | 81 |
| 40 | 79 | 40 | 90 |
| 50 | 81 | 50 | 72 |
| 60 | 81 | 60 | 86 |
| 70 | 56 | 70 | 61 |
| 80 | 0.21 | 80 | 16 |
| 90 | 0.08 | 90 | 0 |

With a solvent containing up to 70% of ethanol or acetone, the proteins migrate mostly into the extract.

APPLICATION EXAMPLE 1

In a conventional manner, a "Gyoza" food was produced by mixing 220 parts of minced pork, 80 parts of lard, 140 parts of textured soybean protein product (2.5 times hydrated), 8 parts of sodium chloride, 20 parts of sesame oil, 20 parts of sweet sake, 230 parts of cabbage (minced), 174 parts of onion (minced), 60 parts of leek (minced), 20 parts of ginger juice, 10 parts of garlic (paste) and 18 parts of condiment with 5 parts of the polysaccharide prepared in Example 1, wrapping 15 g of the mixture each in a Gyoza-skin or sheet and steaming the wrapped product for 20 minutes.

The addition of the polysaccharide according to this invention resulted in increased firmness, improved wrapping performance and improved tastes.

APPLICATION EXAMPLE 2

260 parts of minced pork, 250 parts of minced mutton, 150 parts of lard, 250 parts of cold water, 48 parts of corn starch, 5 parts of sugar, 25 parts of sodium chloride, 5 parts of sodium polyphosphate, 0.1 part of sodium nitrite, 0.5 part of sodium ascorbate, 1.4 part of smoke powder, 3 parts of sausage seasoning and 2 parts of condiment were mixed with 10 parts of the polysaccharide obtained in Example 2 by means of a silent cutter in a conventional manner. The resultant mixture was packed into polyvinylidene chloride casing and heated in a warm water bath at 80° C. for 40 minutes, after which it was cooled in cold water to produce a series of sausages. These sausages had a firm and elastic texture and an improved flavor.

APPLICATION EXAMPLE 3

Using a powdered cream soup composed of 30 parts of wheat flour, 9 parts of corn starch, 31 parts of skimed milk powder, 3 parts of beef tallow, 4 parts of sodium L-glutamate, 8 parts of sodium chloride, 5 parts of sugar, 8 parts of natural condiment powder and 2 parts of spice as a basal composition, 5 parts of the powdered polysaccharide obtained in Example 1 was evenly compounded with the above composition to produce a powdered cream soup. To this soup was added 1200 parts by volume of boiling water at one time with stirring. The resultant soup was found to be homogenous and have a good flavor.

APPLICATION EXAMPLE 4

(A) A fish paste food produced in the conventional manner from 100 parts of minced paste of frozen fish flesh, 2.5 parts of sodium chloride, 5 parts of potato starch, 3 parts of sweet sake, 1 part of sodium glutamate and 30 parts of water on the one hand and (B) a similar fishpaste produced from the same materials plus 1 part of the soybean polysaccharide obtained in Example 4 on the other hand were tested for firmness by texturometer and pressure-released water.

|   | Firmness | Press-released water |
|---|----------|----------------------|
| A | 4.6 T.U. | 37.0 % |
| B | 5.3 T.U. | 32.0 % |

Thus, the addition of soybean polysaccharide results in increased firmness and reduced press-released water.

APPLICATION EXAMPLE 5

A cream soup powder comprised of 30 parts wheat flour, 9 parts corn starch, 31 parts skim milk powder, 3 parts beef tallow, 4 parts sodium L-glutamate, 8 parts sodium chloride, 5 parts sugar, 8 parts natural condiment powders and 2 parts spice was used as a basal composition and this was evenly mixed with 5 parts of the polysaccharide powders obtained in Example 4 to prepare a powdered cream soup.

To this soup was added 1200 parts by volume of boiling water at one time with stirring. The resultant cream soup was a homogeneously dispersed food with an excellent flavor.

What we claim is:

1. A method for producing soybean polysaccharides which comprises extracting a residue, which is obtained after separation of a soy milk from soybeans by an extractive separation technique, with an aqueous alkaline solution having a pH value not less than 11 and recovering the resultant solid matter containing the soybean polysaccharides.

2. A method according to claim 1, wherein the alkali is ammonium hydroxide.

3. A method according to claim 1, wherein the objective polysaccharides contain no more than about 13% of protein (on a dry basis).

4. A method according to claim 1 wherein the temperature of extracting the residue is in the range of about 40° to 60° C.

5. A method according to claim 1, wherein the alkali is an alkali metal hydroxide.

6. A method according to claim 5, wherein the alkali is sodium hydroxide.

7. A method according to claim 1, wherein the aqueous alkaline solution contains a water-miscible organic solvent.

8. A method according to claim 7, wherein pH value of the aqueous alkaline solution is not less than 11.

9. A method according to claim 7, wherein the alkali is ammonium hydroxide.

10. A method according to claim 7, wherein the content of the water-miscible organic solvent is 30 to 70 (weight) percent.

11. A method according to claim 7, wherein the water-miscible organic solvent is t-butanol 12. A method according to claim 7, wherein the water-miscible organic solvent is acetone.

13. A method according to claim 7, wherein the objective polysaccharides contain no more than about 13% of protein (on a dry basis).

14. A method according to claim 7, wherein the objective polysaccharides contain no more than about 10% of protein (on a dry basis).

15. A method according to claim 7, wherein the alkali is an alkali metal hydroxide.

16. A method according to claim 15, wherein the alkali is sodium hydroxide.

17. A method according to claim 7, wherein the water-miscible organic solvent is a lower alcohol having 1 to 3 carbon atoms.

18. A method according to claim 17, wherein the lower alcohol is ethanol.

19. A method according to claim 17, wherein the lower alcohol is methanol.

20. A method according to claim 17, wherein the lower alcohol is n-propanol.

21. A method according to claim 17, wherein the lower alcohol is i-propanol.

22. A method for producing soybean polysaccharides, which comprises extracting soybeans or defatted soybeans with water, an aqueous dilute salt solution or an aqueous dilute alkaline solution and recovering the resultant residue, then subjecting the resultant residue to extraction with an aqueous alkaline solution of pH 11 or higher, which contains or does not contain an organic water-miscible solvent in an amount of 30 to 70 weight percent, and finally recovering the resultant solid matter containing the soybean polysaccharides.

* * * * *